US012774384B2

(12) United States Patent
Karunakaran

(10) Patent No.: US 12,774,384 B2
(45) Date of Patent: Oct. 27, 2026

(54) ACRYLATE-EPOXY RESIN COMPOSITIONS

(71) Applicant: LYONDELLBASELL COMPOSITES LLC, Houston, TX (US)

(72) Inventor: Krishnan Karunakaran, Lake Jackson, TX (US)

(73) Assignee: LyondellBasell Composites LLC, Houston, TX (US)

(*) Notice: Subject to any disclaimer, the term of this patent is extended or adjusted under 35 U.S.C. 154(b) by 651 days.

(21) Appl. No.: 18/198,939

(22) Filed: May 18, 2023

(65) Prior Publication Data

US 2023/0416522 A1 Dec. 28, 2023

Related U.S. Application Data

(60) Provisional application No. 63/343,613, filed on May 19, 2022.

(51) Int. Cl.

| | |
|---|---|
| ***C08L 63/04*** | (2006.01) |
| ***C08G 59/24*** | (2006.01) |
| ***C08G 59/40*** | (2006.01) |
| ***C08G 59/42*** | (2006.01) |
| ***C08G 59/68*** | (2006.01) |
| ***C08K 5/21*** | (2006.01) |
| ***C08K 5/315*** | (2006.01) |
| ***C08K 7/14*** | (2006.01) |
| ***C08L 63/00*** | (2006.01) |

(52) U.S. Cl.

CPC ............ *C08L 63/04* (2013.01); *C08G 59/245* (2013.01); *C08G 59/4021* (2013.01); *C08G 59/42* (2013.01); *C08G 59/686* (2013.01); *C08K 5/21* (2013.01); *C08K 5/315* (2013.01); *C08K 7/14* (2013.01); *C08L 63/00* (2013.01)

(58) Field of Classification Search

CPC .. C08G 59/245; C08G 59/4021; C08G 59/42; C08G 59/686; C08K 5/21; C08K 5/315; C08K 7/14; C08L 63/00; C08L 63/04

See application file for complete search history.

(56) References Cited

U.S. PATENT DOCUMENTS

| | | | | |
|---|---|---|---|---|
| 3,496,250 | A | 2/1970 | Czerwinski | |
| 4,987,186 | A * | 1/1991 | Akiyama | C09J 133/062 525/379 |
| 5,043,102 | A * | 8/1991 | Chen | C08F 292/00 428/416 |
| 11,142,610 | B2 * | 10/2021 | Kano | C08G 59/245 |
| 2006/0106168 | A1 * | 5/2006 | Ota | C08G 18/4277 525/124 |
| 2008/0185757 | A1 * | 8/2008 | Takano | C08J 5/249 264/319 |
| 2010/0059174 | A1 | 3/2010 | Tietze et al. | |
| 2012/0259039 | A1 * | 10/2012 | Kobayashi | C08J 5/04 525/530 |
| 2016/0332339 | A1 | 11/2016 | Boursier | |

FOREIGN PATENT DOCUMENTS

| | | | |
|---|---|---|---|
| EP | 0309982 | A2 | 4/1989 |
| EP | 3357952 | A1 | 8/2018 |
| WO | 2017087098 | A1 | 5/2017 |

OTHER PUBLICATIONS

The International Search Report and The Written Opinion for PCT/US2023/022657 mailed Aug. 11, 2023.

* cited by examiner

*Primary Examiner* — James C Goloboy

(57) ABSTRACT

Curable acrylate-epoxy resin blends comprising an epoxy resin, a crosslinking accelerator, a latent hardener, an acrylate monomer component, and a free radical initiator are provided. Such curable acrylate-epoxy resin blends have a low viscosity and a long pot life. Such curable acrylate-epoxy resin blends are mixed with a fiber component and optionally fillers and then heated to polymerize the acrylate monomer component to form semi-solid molding compounds having a long shelf life. Such molding compounds are molded and further heated to crosslink the epoxy resin to form shaped articles of substantially rigid composite materials.

17 Claims, No Drawings

ACRYLATE-EPOXY RESIN COMPOSITIONS

CROSS-REFERENCE TO RELATED APPLICATIONS

The application claims the benefit of priority to U.S. Provisional Patent Application No. 63/343,613, filed on May 19, 2022, which is incorporated herein by reference in its entirety.

FIELD OF THE INVENTION

This disclosure relates to curable acrylate-epoxy resin blends comprising an epoxy resin and an acrylate monomer component, such blends having a low viscosity and a long pot life. Compositions comprising such acrylate-epoxy resin blends, a fiber component, and optionally a filler are partially cured to polymerize the acrylate monomer component and form, semi-solid molding compounds. Such molding compounds are molded and fully cured to crosslink the epoxy resin and form shaped articles of substantially rigid composite materials.

BACKGROUND OF THE INVENTION

Epoxy technology and methods of curing a range of epoxy resins with a variety of hardeners, crosslinking accelerators, and other reactive additives, have continued to evolve since the first epoxy patents were issued in the 1930s. More recent developments include sheet molding compounds ("SMC") and bulk molding compounds ("BMC"), wherein composite materials are formed by curing a suspension of a fiber component in a resin matrix.

Depending on the end-use application, SMC and BMC systems are formulated to achieve close dimensional control, flame and track resistance, electrical insulation, corrosion and stain resistance, superior mechanical properties, low shrink, and color stability. BMC and SMC are both fiber reinforced materials, utilizing fiber strands of varying lengths from various materials. SMC uses slightly longer length fibers and a higher percentage of reinforcement than BMC.

Rising demand for components having higher strength at a lower weight than comparable metal parts is driving the market growth for SMC and BMC worldwide. SMCs and BMCs are used to produce improved components in many fields and/or industries, including, but not limited to, automotive, aircraft, aerospace, oil and gas, and home appliances and fixtures.

One of the ways to obtain SMCs and BMCs is by impregnating reinforcing fibers within a heat-curable resin composition, and then partially curing (also called as B-staging) the heat-curable resin composition contained in the impregnated material. Parts having desirable properties can be produced by heating and compressing heat-curable SMC or BMC inside a mold to fully cure the partially-cured resin composition contained in the SMC or BMC.

There are three general phases in production of articles comprising composites using SMC and BMC systems:

1) The "A-stage" is early stage in the reaction of some molding compounds in which the components of the molding compounds are mixed, typically at about room temperature.
2) The "B-stage" is an intermediate reaction stage wherein the composition comprising the components of the molding compound is mixed a fiber component and partially cured to form a semi-solid material that is not workable, or no longer in a liquid state.
3) The "C-stage" is the final reaction stage of some molding compounds where the thermosetting resin is fully reacted, or crosslinked, to form a hardened solid composite material. Thermosetting systems in a full cured state are in C-stage.

Tailoring properties of resins in the A-stage and B-stage while maintaining the desired final properties in the C-Stage could advantageously reduce production time for many applications. It would be desirable for some applications to provide an acrylate-epoxy resin SMC or BMC, which has low viscosity and a long pot time at ambient temperature to enable good wetting of the suspended fiber component and permit sufficient working time during A-stage. It would further be desirable to have a fast maturation during B stage to a semi-solid to facilitate easy folding, wrapping, and cutting. Additionally, it would further be desirable to have a fast curing time at elevated temperature to form a hardened solid composite material during the C-stage. A curable resin system that promotes such performance in the A-stage, B-stage, and C-stage would increase productivity in production of composite materials for certain applications.

Improved curable resin blends for use in SMC and BMC systems that improve the workability of the systems during A-stage and B-stage, while maintaining mechanical properties in C-stage are needed. A valuable approach would avoid expensive additives and performance tradeoffs. Ideally, improved curable resin blends could be made using economical starting materials, commonly-used equipment, and familiar techniques.

SUMMARY OF THE INVENTION

In general, the present disclosure relates to molding compounds based on curable resin blends comprising an epoxy resin composition, a latent hardener, a crosslinking accelerator, an acrylate monomer component, and a free radical initiator. Optionally, the curable resin blends further comprise a toughening agent and/or a reactive diluent. Molding compound precursor compositions, upon which molding compounds disclosed herein are based, comprise the curable resin blend and optionally one or more of fillers and/or additives typically used in BMC and/or SMC systems, such as, but not limited to, mineral fillers, fire retardants, mold release agents, or combinations thereof. The molding compound precursor compositions are then mixed with at least one fiber component during the B-stage and partially cured to form the molding compound.

One benefit of the acrylate monomer component in the curable resin blends disclosed herein instead of an acrylate-based polymer, is that the acrylate monomer component reduces the viscosity of the curable resin blend during the A-stage. This reduction in viscosity permits a more homogeneous mixing of the fiber component in the curable resin blend and results in improved fiber wetting in forming the composition upon which the molding compound is based.

Another benefit of the acrylate monomer component in the curable resin blends disclosed herein instead of an acrylate-based polymer, is that the free-radical initiator and acrylate monomer component react to form an acrylate-based polymer when the molding compound precursor composition, comprising the curable resin blend, fiber component, and optionally filler, is heated to a temperature in the range of from 50° C. to 120° C. during the transition from A-stage to B-stage. This results in a fast maturation time of the composition into a molding compound of less than or equal to one hour through polymerization of a major portion of the acrylate monomer component, without affecting the properties of the final molded composite in the C-Stage.

In some embodiments, in addition to the foregoing attributes of the curable resin blends, the epoxy resin composition comprises bisphenol-epoxy resin, a novolac-epoxy resin, cycloaliphatic epoxy resin, or a combination thereof.

In some embodiments, in addition to the foregoing attributes of the curable resin blends, the latent hardener comprises a member selected from the group consisting of an anhydride compound, a guanidine compound, aromatic amine or a combination thereof.

In some embodiments, in addition to the foregoing attributes of the curable resin blends, the crosslinking accelerator comprises a member selected from the group consisting of an imidazole compound, a urea derivative, or a combination thereof.

In some embodiments, the free radical initiator comprises a peroxide compound, an azo compound, or a combination thereof.

In some embodiments, the molding compound precursor composition can be mixed with at least one fiber component and formed into a sheet or other 3-dimensional shape and thereafter partially cured to form semi-solid molding compounds. In this instance, partial curing means the polymerization of the acrylate monomer component in the curable resin blend, resulting in a molding compound having a shelf life in the range of from one month to six months or twelve months.

In other embodiments, the molding compounds are molded and further heated to fully cure the molding compounds to form substantially rigid shaped articles of composite materials.

The foregoing has outlined rather broadly the features and technical advantages of the present invention in order that the detailed description of the invention that follows may be better understood. Additional features and advantages of the invention will be described hereinafter, which form the subject matter of the claims of the invention. It should be appreciated by those skilled in the art that the conception and specific embodiments disclosed may be readily utilized as a basis for modifying or designing other compositions and/or processes for carrying out the same purposes of the present invention. It should also be realized by those skilled in the art that such equivalent constructions do not depart from the spirit and scope of the invention as set forth in the appended claims. The novel features which are believed to be characteristic of the invention, both as to its structure and method of manufacture, together with further objects and advantages will be better understood from the following description.

DETAILED DESCRIPTION OF THE INVENTION

Illustrative embodiments of the subject matter claimed below will now be disclosed. In the interest of clarity, some features of some actual implementations may not be described in this specification. It will be appreciated that in the development of any such actual embodiments, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure. If any, the section headings and any subtitles used herein are for organizational purposes only and are not to be construed as limiting the subject matter described in any way. The contents under a section heading and/or subtitle are not limited to the section heading and/or subtitle, but apply to the entire description of the present invention.

The words and phrases used herein should be understood and interpreted to have a meaning consistent with the understanding of those words and phrases by those skilled in the relevant art. As used herein, the singular forms "a", "an" and "the" may be intended to include the plural forms as well, unless the context clearly indicates otherwise. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

The term "about" means the stated value plus or minus the margin of error of measurement or plus or minus 10% if no method of measurement is indicated.

The term "B-staging," as used herein, means a process that utilizes heat to partially cure a resin mixture in the molding compound, thereby allowing a construction to be "staged." Though B-staging can use ultraviolet ("UV") light to cure the resin, such method is not used herein as UV curing will result polymerization of less than a majority of the acrylate monomer component. Specifically, the UV light would cure only the surface of the composition comprising the curable resin blend and fiber component, leaving any bulk acrylate monomer below the surface unreacted. In some embodiments, at least a majority of the acrylate monomer component is polymerized and/or crosslinked during B-staging. In some embodiments, substantially all or all of the acrylate monomer component is polymerized and/or crosslinked. The B-staging in the present application involves heating the curable resin blend to a temperature in the range of from to 120° C. for at least 10 minutes or at least 15 minutes. Such polymerization and/or crosslinking of the acrylate monomer component transforms the composition comprising the curable resin blend and the fiber component into a semi-solid consistency in the form of a sheet in the case of a sheet molding compound ("SMC") or in the form of a three-dimensional shape in the case of a bulk molding compound ("BMC") wherein the SMC or BMC is suitable for placement in a mold for final shaping and curing of the epoxy resin component of the SMC or BMC.

The term "C-staging," as used herein, means a process that utilizes heat to cure at least a majority of the epoxy resin in the curable resin blend in the molding compound. In some embodiments, substantially all or all of the epoxy resin component in the molding compound is crosslinked. During C-staging, the SMC or BMC is place in a mold and subjected to heat at least higher than the B-staging temperature wherein the simple shape of the SMC or BMC will soften to conform to the shape of the mold. With continued heating, the epoxy resin component of the SMC or BMC is cross-linked to transform the semi-solid molding compound into a substantially rigid composite material conforming to the shape of the mold. One of ordinary skill in the art would select the appropriate temperature and time period of heating required to achieve the desired state of curing of the particular epoxy resin used in a specific application.

The term "fully cured" as it is used in relation to the C-stage means both the reaction between the epoxy resin and the latent hardener is complete and polymerization and/or crosslinking of the acrylate monomer component is also complete.

The term "partially cured" as it is used in relation to B-stage means that at least a majority (i.e. at least 50%) of the acrylate monomer component of the molding compound precursor composition is polymerized and/or crosslinked, but less than a majority of the epoxy resin component of the molding compound precursor compositions is crosslinked. In some embodiments, a substantially all or all of the acrylate monomer component is polymerized and/or cross-linked in the molding compound, which is the product of the B-staging. In some embodiments, substantially all or all of the epoxy resin component is unreacted, meaning that it has not been crosslinked, in the molding compound, which is the product of the B-staging. The resulting molding compound is stored for some period of time, such as one month, two months, or three months. After such storage, the molding compound can be unrolled, cut, and/or otherwise trimmed to a shaped suitable for insertion into a selected mold for final curing. Because of this partial curing, the molding compound can still flow under heat and pressure into a mold for full curing, during which the molding compound is hardened by the reaction of the latent hardener with the epoxy resin at higher temperatures and/or pressures to crosslink the epoxy resin.

The term "pot life," as used herein, means the length of time that a curable resin composition, remains mostly in a liquid state at room temperature (in the range of from 19° C. to with a viscosity low enough to be workable and formed into a sheet or other desired shape for storage as a BMC or SMC. Curable resin blends disclosed herein have a pot life, or in other words, remain in A-stage of greater than or equal to 1 hour, greater than or equal to 12 hours, greater than or equal to 18 hours, or greater than or equal to 24 hours. In some embodiments, curable resin blends disclosed herein have a maximum pot life of 36 hours.

The term "substantially all" means greater than or equal to 90%, greater than or equal to 95%, or greater than or equal to 99%, based on the relevant parameter. For example, in the case of the acrylate monomer component, substantially all of the acrylate monomer component being polymerized and/or crosslinked means that greater than or equal to 90%, greater than or equal to 95%, or greater than or equal to 99% of the polymerizable bonds of the acrylate monomer component have been reacted by polymerization or crosslinking. In the case of the epoxy resin, substantially all of the epoxy resin component being crosslinked means that greater than or equal to 90%, greater than or equal to 95%, or greater than or equal to 99% of the functional groups reactive for crosslinking have been reacted to form crosslinks.

The term "wt. %," as used herein, means weight percent.

I. Molding Compound Precursor Composition

The molding compound precursor composition is a mixture of the curable resin blend and optionally one or more additives and/or fillers prior to any curing induced by heating the mixture to greater than room temperature or greater than 30° C. In some embodiments, the molding compound precursor compositions described herein comprise only a curable resin blend. In other embodiments, the molding compound precursor compositions described herein comprise a curable resin blend in the range of from 20 wt. % to 100 wt. %, a filler in the range of from 0 wt. % to 80 wt. %, and one or more additives, the total of such additives in the range of from 0 wt. % to 50 wt. %, wherein the weight percentages are based on the total weight of the molding compound precursor composition.

1. Curable Resin Blend

In one aspect of the present disclosure is a curable resin blend comprising an epoxy resin component, a latent hardener, a crosslinking accelerator, an acrylate monomer component, a free-radical initiator, and optionally a toughening agent and/or a reactive diluent. The epoxy resin composition comprises a bisphenol-epoxy resin, a novolac-epoxy resin, a cycloaliphatic epoxy resin, or a combination thereof. The latent hardener comprises a member selected from the group consisting of an anhydride compound, a guanidine compound, or a combination thereof. The curable resin blend further comprises a crosslinking accelerator comprising a member selected from the group consisting of an imidazole compound, a urea derivative, or a combination thereof. The curable resin blend can also include additives typically found in SMC and BMC systems, such as, but not limited to, fillers, fire retardants, mold release agents, and or combinations thereof.

In some embodiments, the curable resin blend comprises or alternatively consists essentially of: from about 20 wt. % to about 90 wt. %, about 25 wt. % to about 85 wt. %, or about 30 wt. % to about 80 wt. %, of the epoxy resin; from about 1 wt. % to 50 wt. %, about 2 wt. % to about 45 wt. %, or about 3 wt. % to about 40 wt. %, of the latent hardener; from about 0.1 wt. % to about 5 wt. %, about 0.5 wt. % to about 4 wt. %, or about 1 wt. % to about 3 wt. %, of the crosslinking accelerator; from about 10 wt. % to about 70 wt. %, about 12 wt. % to about 50 wt. %, or about 14 wt. % to about 30 wt. %, of the acrylate monomer component; from about 0.1 wt. % to about 5 wt. %, about 0.5 wt. % to about 5 wt. %, or about 1 wt. % to about 3 wt. %, of the free radical initiator, from greater than 0 wt. % to about 10 wt. % of the toughening agent (when present), and from greater than 0 wt. % to 10 wt. % of a reactive diluent (when present). All of the foregoing weight percentages are based on the total weight of the curable resin blend, and all components sum to 100%.

In some embodiments, the curable resin blend comprises or alternatively consists essentially of: from about 60 wt. % to about 90 wt. %, about 65 wt. % to about 85 wt. %, or about wt. % to about 80 wt. %, of the epoxy resin, wherein the epoxy resin comprises or alternatively consists essentially of a bisphenol-epoxy resin; from about 2 wt. % to about 10 wt. %, about 3 wt. % to about 8 wt. %, or about 4 wt. % to about 6 wt. %, of the latent hardener, wherein the latent hardener comprises or alternatively consists essentially of a substituted guanidine; from about wt. % to about 4 wt. %, about 0.5 wt. % to about 3 wt. %, or about 1 wt. % to about 2 wt. %, of the crosslinking accelerator, wherein the crosslinking accelerator comprises or alternatively consists essentially of a urea derivative; from about 10 wt. % to about 70 wt. %, about 12 wt. % to about 50 wt. %, or about 14 wt. % to about 25 wt. %, of the acrylate monomer component, wherein an acrylate monomer component is selected from the group consisting of an acrylate, an acrylate derivative, methacrylate, a methacrylate derivative, or a combination thereof; from about 0.1 wt. % to about 3 wt. %, about 0.5 wt. % to about 1.5 wt. %, or about 1.0 wt. % to about 2 wt. %, of the free radical initiator, wherein the free radical initiator comprises or alternatively consists essentially of, a peroxide compound; from greater than 0 wt. % to about 10 wt. % of the toughening agent (when present), and from greater than 0 wt. % to 10 wt. % of a reactive diluent (when present). All of the foregoing weight percentages are based on the total weight of the curable resin blend, and all components sum to 100%.

In some embodiments, the curable resin blend comprises or alternatively consists essentially of: from about 20 wt. % to about 60 wt. %, about 25 wt. % to about 55 wt. %, or about wt. % to about 50 wt. %, of the epoxy resin, wherein the epoxy resin comprises or alternatively consists essentially of a novolac-epoxy resin; from about 20 wt. % to about 60 wt. %, about 25 wt. % to about 55 wt. %, or about 30 wt. % to about 50 wt. %, of the latent hardener, wherein the latent hardener comprises or alternatively consists essentially of nadic methyl anhydride; from about wt. % to about 4 wt. %, about 0.5 wt. % to about 3 wt. %, or about 1 wt. % to about 2 wt. %, of the crosslinking accelerator, wherein the crosslinking accelerator comprises or alternatively consists essentially of a imidazole compound; from about 10 wt. % to about 70 wt. %, about 12 wt. % to about 50 wt. %, or about 14 wt. % to about 25 wt. %, of the acrylate monomer component, wherein an acrylate monomer component is selected from the group consisting of an acrylate, an acrylate derivative, methacrylate, a methacrylate derivative, or a combination thereof from about wt. % to about 3 wt. %, about 0.5 wt. % to about 1.5 wt. %, or about 1.0 wt. % to about 2 wt. %, of the free radical initiator, wherein the free radical initiator comprises or alternatively consists essentially of, a peroxide compound; from greater than 0 wt. % to about 10 wt. % of the toughening agent (when present), and from greater than 0 wt. % to 10 wt. % of a reactive diluent (when present). All of the foregoing weight percentages are based on the total weight of the curable resin blend, and all components sum to 100%.

The components of the curable resin blend are described in more detail below.

a) Epoxy Resin

In one aspect of the present disclosure is a curable resin blend comprising an epoxy resin composition comprising a bisphenol-epoxy resin, a novolac-epoxy resin, a cycloaliphatic epoxy resin, or a combination thereof.

In some embodiments, the epoxy resin has from 2 to 10, 2 to 6, 2 to 4, or 2, epoxy groups. The epoxy groups in particular are glycidyl ether groups produced during the reaction of alcohol groups with epichlorohydrin.

In some embodiments, the epoxy resins can be low-molecular-weight compounds, which have an average molar mass (Mn) less than or equal to 1000 g/mol. In some embodiments, the epoxy resins can be high-molecular-weight compounds, which have an average molar mass (Mn) greater than 1000 g/mol. Such polymeric epoxy resins have a degree of oligomerization of from 2 to 25, or 2 to 10, units.

Industrially important materials are epoxy resins obtainable via reaction of epichlorohydrin with compounds having at least two reactive H atoms, in particular with polyols. In some embodiments, the resins, prior to reacting with epichlorohydrin to form a epoxy resin, comprise cycloaliphatic compounds, aromatic compounds, or combinations thereof. In some instances, the resins comprise compounds having two aromatic rings, two aliphatic 6-membered rings, or oligomers of such compounds. In some instances, the resins comprise at least two, or two, hydroxyl groups, and two aromatic or aliphatic 6-membered rings. In some embodiments, the resins comprise a bisphenol compound, such as, but not limited to bisphenol A, bisphenol F, hydrogenated bisphenol A, and/or hydrogenated bisphenol F.

The corresponding epoxy resins are the diglycidyl ethers of bisphenol A, bisphenol F, hydrogenated bisphenol A, and/or bisphenol F. In some embodiments, the epoxy resin comprises bisphenol A diglycidyl ether ("DGEBA") and/or bisphenol F diglycidyl ether ("DGEBF"). As used herein, the expressions bisphenol A, bisphenol F, hydrogenated bisphenol A, hydrogenated bisphenol F, DGEBA and DGEBF include not only the corresponding monomers but also the corresponding oligomeric variants. In some embodiments, the epoxy resin a diglycidyl ether of a monomeric or oligomeric diol, such as, but not limited to, a diol selected from the group consisting of bisphenol A, bisphenol F, hydrogenated bisphenol A, hydrogenated bisphenol F, or combinations thereof. In some embodiments, the degree of oligomerization of an oligomeric diol is from 2 to 25, or from 2 to 10, units.

In some embodiments, the epoxy resin comprises a cycloaliphatic epoxy resin containing at least one cycloaliphatic group and one or more oxirane groups, such as, but not limited to, tetrahydrophthalic acid diglycidyl ether, vinylcyclohexene diepoxide, 3,4-epoxycyclohexylmethyl 3',4'-epoxycyclohexylcarboxylate ("ECC"), diglycidyl 1,2-cyclohexanedicarboxylate, 3,4-epoxycyclohexylmethyl methacrylate, cyclohexanedimethanol diglycidyl ether, 1,4-cyclohexanedimethanol diglycidyl ether, cycloaliphatic epoxy resins include di epoxylimonene, 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinyl cyclohexanedioxide, bis(3,4-epoxycyclohexylmethyl)adipate, bis(3,4-epoxy-6-methylcyclohexylmethyl)adipate, exo-exo bis(2,3-epoxycyclopentyl) ether, endo-exo bis(2,3-epoxycyclopentyl) ether, 2,2-bis(4-(2,3-epoxypropoxy) cyclohexyl)propane, 2,6-bis(2,3-epoxypropoxycyclohexyl-p-dioxane), 2,6-bis(2,3-epoxypropoxy)norbornene, the diglycidylether of linoleic acid dimer, limonene dioxide, 3-vinylcyclohexene oxide, 3-vinylcyclohexene dioxide, epoxidized poly(1,3-butadiene-acrylonitrile), epoxidized soybean oil, epoxidized castor oil, epoxidized linseed oil, 2,2-bis(3,4-epoxycyclohexyl)propane, dicyclopentadiene dioxide, tricyclopentadiene dioxide, tetracyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxy-hexahydro-4,7-methanoindane, o-(2,3-epoxy) cyclopentylphenyl-2,3-epoxypropyl ether), 1,2-bis[5-(1,2-epoxy)-4,7-hexahydromethanoindanoxyl]ethane, cyclopentenylphenyl glycidyl ether, cyclohexanediol diglycidyl ether, and diglycidyl hexahydrophthalate. Siloxane functional epoxy resins may also be utilized such as 1,3-bis (3,4-epoxycyclohexyl-2-ethyl)-1,1,3,3-tetramethyldisiloxane and other epoxy functional linear/cyclic siloxanes such as those disclosed in U.S. Pat. No. 7,777,064, the disclosure of which being hereby expressly incorporated herein by reference. In particular embodiments cycloaliphatic epoxy resins are 3,4-epoxycyclohexylmethyl-3,4-epoxycyclohexanecarboxylate and 3,4-epox-6-methylcyclohexylmethyl-3,4-epoxy-6-methylcyclohexanecarboxylate. Other examples of cycloaliphatic epoxies suitable for use herein include those disclosed and described in U.S. Pat. No. 6,429,281, the disclosure of which is incorporated herein by reference.

Other suitable epoxy resins include, glycidated amino resins (N,N-diglycidyl-para-glycidyloxyaniline, N,N-diglycidyl-meta-glycidyloxyaniline, N,N,N',N'-tetraglycidyl-4, 4'-methylenedianiline), and combinations thereof. In some embodiments, epoxy resins include the reaction products of epichlorohydrin with other resins, such as, but are not limited to, cresols, phenol-aldehyde adducts, phenol-formaldehyde resins, and/or novolac resins.

In some embodiments, the epoxy resins, or mixtures thereof, are characterized by one or more, two or more, or all of the following: a) are liquid at room temperature (25° C.); b) have a viscosity in the range from 8,000 to 12,000 Pa*sec at room temperature (25° C.); and/or c) have an epoxy equivalent weight ("EEW") in the range of from 150 to 250, or from 170 to 200, wherein EEW gives the average mass of the epoxy resin in g per mole of epoxy group.

In some embodiments, epoxy resin component is a DGEBA, a novolac-epoxy resin, or a mixture of various epoxy resins is used as epoxy resin component of the curable resin blend). In some embodiments, the mixture is the combination of DGEBA and epoxy-novolac resins. In some embodiments, the mixture is the combination of DGEBA and epoxy-novolac resins, in a ratio by weight of DGEBA to epoxy-novolac in the range of from 40:60 to 70:30. In yet other embodiments, the chosen epoxy resin is ECC.

In some embodiments, the epoxy resin comprises a bisphenol-epoxy resin, which is the reaction product of a bisphenol resin and epichlorohydrin. In some instances, the bisphenol resin is bisphenol A. In some embodiments, the bisphenol resin has one or more, two or more, three or more, four or more, or all of the following properties:

a) an epoxide equivalent weight in the range of from 150 g/eq to 210 g/eq;
b) a viscosity at 25° C. in the range of from 2,000 mPa·s to 17,000 mPa·s, or from 8,000 mPa·s to 12,000 mPa·s;
c) a density at 25° C. in the range of from 1.10 g/ml to 1.20 g/ml; and
d) a hydrolyzable chlorine content in the range of from 400 ppm to 600 ppm.

In some embodiments, the epoxy resin comprises a novolac-epoxy resin, which is the reaction product of a novolac resin and epichlorohydrin. In some embodiments, the bisphenol resin has one or more, two or more, three or more, four or more, or all of the following properties:

a) an epoxide equivalent weight in the range of from 100 g/eq to 250 g/eq, or from 150 g/eq to 210 g/eq;
b) a viscosity at a temperature above ~40° C. in the range of from 20,000 mPa·s to 50,000 mPa·s;
c) a density at 25° C. in the range of from 1.15 g/ml to 1.25 g/ml; and
d) a hydrolyzable chlorine content in the range of from 1,400 ppm to 1,600 ppm.

b) Latent Hardener

Hardening agents, or latent hardeners, are thermally activatable curatives that only progress the epoxy-resin composition to the fully cured when heated to an effective temperature for a sufficient time period. In some embodiments, the latent hardener is an anhydride compound, a guanidine compound, or a combination thereof.

A latent hardener used in the curable resin blend of the invention can comprise any compound or mixture thereof that is known for this purpose, and that under ambient conditions (temperature of from 10° C. to 50° C. at atmospheric pressure) does not react significantly with the epoxy resin used, but which at elevated temperature (for example above 80° C., in particular above 120° C.) reacts to give crosslinking with the epoxy resin used.

A reaction that is not significant between the latent hardener and the epoxy resin is a reaction which within 24 hours under ambient conditions leads at most to doubling of the viscosity of the epoxy-resin composition. For example, in some embodiments, increase of the viscosity at room temperature (25° C.) within 24 hours ranges from 0% to 100%. Hardeners which react with the epoxy resin even at relatively low temperatures lead to products with inadequate shelf life in B-stage. Desirable shelf lives are at least 1 month, at least 2 months, or at least 3 months, at room temperature (about 19° C. to about 30° C.). In this context shelf life is the period that begins with production and within which the partially cured B-staged product, or molding compound, can still be used advantageously for the shaping (for example in a compression process) of cured composite materials.

Exemplary anhydride compounds include, but are not limited to, cyclohexane-1,2-dicarboxylic acid anhydride, 1-cyclohexene-1,2-dicarboxylic acid anhydride, 2-cyclohexene-1,2-dicarboxylic acid anhydride, 3-cyclohexene-1,2-dicarboxylic acid anhydride, 4-cyclohexene-1,2-dicarboxylic acid anhydride, 1-methyl-2-cyclohexene-1,2-dicarboxylic acid anhydride, 1-methyl-4-cyclohexene-1,2-dicarboxylic acid anhydride, 3-methyl-4-cyclohexene-1,2-dicarboxylic acid anhydride, 4-methyl-4-cyclohexene-1,2-dicarboxylic acid anhydride, polysebacic anhydride, polyazelaic anhydride, dodecenylsuccinic anhydride, succinic anhydride, substituted succinic anhydride, 4-methyl-1-cyclohexene-1,2-dicarboxylic acid anhydride, phthalic anhydride, methylhexahydrophthalic anhydride ("MHHPA"), hexahydrophthalic anhydride ("HHPA"), nadic methyl anhydride ("NMA"), dodecyl succinic anhydride, dodecenylsuccinic anhydride ("DDSA"), tetrahydrophthalic anhydride, citric acid anhydride, maleic anhydride and special adducts of maleic anhydride, maleic anhydride vinyl and styrene copolymers of maleic anhydride, pyromellitic dianhydride, trimellitic anhydride, benzophenonetetracarboxylic dianhydride, bicyclo[2.2.1]hept-5-ene-2,3-dicarboxylic anhydride, methylbicyclo[2.2.1]hept-5-ene-2,3-dicarboxylic anhydride, bicyclo[2.2.1]hept-5-ene-2,3-dicarboxylic anhydride, dichloromaleic anhydride, chlorendic anhydride, tetrachlorophthalic anhydride and any derivative or adduct thereof, multi-ring alicyclic anhydrides, aromatic anhydride, such as phthalic anhydride, trimellitic anhydride, and combinations thereof.

Exemplary guanidine compounds include, but are not limited to, unsubstituted guanidine and substituted guanidine. Substituted guanidines include, but are not limited to, methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and cyanoguanidine ("dicyandiamide"). Also included are guanamine derivatives such as, but not limited to, alkylated benzoguanamine resins, benzoguanamine resins or methoxymethylethoxymethylbenzoguanamine.

c) Crosslinking Accelerator

In some embodiments, the crosslinking accelerator comprises an imidazole compound, a urea derivative, a Lewis acid-amine complex, a quaternary onium complex, or a combination thereof.

In some embodiments, a crosslinking accelerator includes an imidazole compound such as, but not limited to, 1-methyl imidazole, 2-methyl imidazole, 1,2-dimethyl imidazole, 2-ethyl-4-methyl imidazole, 2-ethyl-2-phenyl imidazole, 1-cyanoethyl-2-ethyl-4-methyl imidazole, or combinations thereof.

In some embodiments, a crosslinking accelerator includes an urea derivative such as, but not limited to, N,N-dimethyl-N'-(3-chloro-4-methyl phenyl)urea, N,N-dimethyl-N'-(4-chlorophenyl)urea, N,N-dimethyl-N'-(3,4-dichlorophenyl) urea, N,N-dimethyl-N'-(3,4-dichloromethyl phenyl)urea, 2,4-(N',N'-dimethyl ureido)toluene, and 1,4-bis(N',N'-dimethyl ureido)benzene, or combinations thereof.

In some embodiments, a crosslinking accelerator includes a Lewis acid-amine complex such as, but not limited to, a boron trifluoride-piperidine complex, a boron trifluoride-monoethylamine complex, a boron trifluoride-triethanolamine complex, a boron trichloride-octylamine complex, or combinations thereof.

The Lewis acid-amine complex includes a Lewis acid. As used herein a "Lewis acid" refers to a material that can accept an electron pair from a base. Examples of Lewis acids include, but are not limited to, boron trihalogenides, such as boron trichloride and boron trifluoride for instance.

The Lewis acid-amine complex includes an amine. Various amines may be utilized for the Lewis acid-amine complex. Examples of suitable amines include, but are not limited to, triethylamine, tri-n-butylamine, dimethylcyclohexylamine, N,N,N',N'-tetramethylethylenediamine, and N,N-dimethylbenzylamine. One or more embodiments of the present disclosure provide that a tertiary amine is utilized for the Lewis acid-amine complex.

One or more embodiments of the present disclosure provide that the Lewis acid-amine complex is a boron trichloride-N,N-dimethyloctylamine complex. The boron trichloride-N,N-dimethyloctylamine complex can be represented by the following formula I:

I

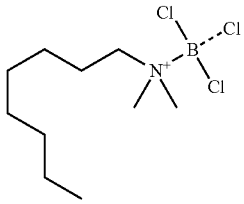

One or more embodiments of the present disclosure provide that the Lewis acid-amine complex is a boron trihalide-amine complex that can be represented by the following formulas IIa or IIb:

IIa

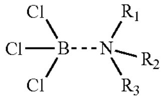

IIb

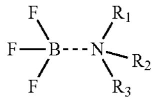

where each $R_1$, $R_2$, and $R_3$ are independently from hydrogen and $C_1$-$C_{18}$ alkyls.

In some embodiments, a crosslinking accelerator includes an onium salt such as an ammonium salt, a phosphonium salt, or combinations thereof. Nonlimiting examples of quaternary ammonium salts include, but are not limited to, salts of benzyl triethylammonium chloride, methylbenzethonium chloride, benzalkonium chloride, cetalkonium chloride, cetrimonium, sodium chloride, domiphen bromide, cetylpyridinium chloride, didecyldimethylammonium chloride, benzethonium chloride, tetraethylammonium bromide, and combinations thereof. Nonlimiting examples of quaternary phosphonium salts include, but are not limited to, salts of tetrabutylphosphonium chloride, benzyltriphenylphosphonium chloride, benzyltrimethylphosphonium chloride, benzyltributylphosphonium chloride, tributylallylphosphonium chloride, tributyl-2-methoxypropylphosphonium chloride, benzylphenyl(dimethylamino)phosphonium chloride, and combinations thereof.

Non-limiting examples of imidazole compounds include, but are not limited to, imidazole, 1-methylimidazole, 2-methylimidazole, 2-ethylimidazole, 2-isopropylimidazole, 2-n-propylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-isopropyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4-methyl-5-hydroxymethylimidazole, 2-phenylimidazole, 2-phenyl-4,5-dihydroxymethylimidazole, 1,2-phenyl-4-methyl-5-hydroxymethylimidazole, 1-dodecyl-2-methylimidazole, 1-cyanoethyl-2-phenyl-4,5-di(2-cyanoethoxy)methylimidazole, and 1-(2-cyanoethyl)-2-ethyl-4-methylimidazole), In some embodiments, the imidazole compound is imidazole itself or a derivative thereof described by the general formula III:

III

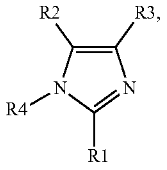

wherein:

- R1 is a hydrogen atom, an alkyl group having from 1 to 10 carbon atoms, an aryl group having from 3 to 16 carbon atoms, or an arylalkyl group having from 4 to 20 carbon atoms,
- R2 and R3 are respectively mutually independently a hydrogen atom or an alkyl group having from 1 to 4 carbon atoms, and
- R4 is a hydrogen atom, an alkyl group having from 1 to 4 carbon atoms, a benzyl group, or an aminoalkyl group having from 2 to 4 carbon atoms and having a primary amino group.

In some embodiments, R1 of the imidazole compound of the general formula III is a hydrogen atom, an alkyl group having from 1 to 4 carbon atoms, an aryl group having from 3 to 7 carbon atoms, or an arylalkyl group having from 4 to 10 carbon atoms, or is a hydrogen atom or an alkyl group having from 1 to 4 carbon atoms.

For the purposes of formula III, alkyl groups have from 1 to 20 carbon atoms. They can be linear, branched, or cyclic. They can be saturated or (poly)unsaturated. They are preferably saturated. They have no substituents having heteroatoms. Heteroatoms are all atoms other than C and H atoms.

For the purposes of formula III, aryl groups have from 3 to 20 carbon atoms. The aromatic ring system can comprise 1 or 2 heteroatoms, preferably nitrogen and/or oxygen, per ring. They have no substituents having heteroatoms. Heteroatoms are all atoms other than C and H atoms.

In one embodiment, R4 of the imidazole compound of the general formula III is a hydrogen atom, an alkyl group having from 1 to 4 carbon atoms, or a benzyl group. Examples of these imidazole compounds are imidazole, 1-methylimidazole, 1-ethylimidazole, 2-methylimidazole, 2-ethylimidazole, 2-undecylimidazole, 2-heptadecylimidazole, 2-phenylimidazole, 1,2-dimethylimidazole, 2-ethyl-4-methylimidazole, 2-phenyl-4-methylimidazole, 1-benzyl-2-phenylimidazole, 1-benzyl-2-methylimidazole.

In one particular embodiment of the invention, the imidazole compound of the formula III is an aminoalkylimidazole where R4 is an aminoalkyl group, preferably having from 2 to 4 carbon atoms and having a primary amino group. Examples of these aminoalkylimidazoles are 1-(2-aminoethyl)-2-methylimidazole, 1-(2-aminoethyl)-2-ethylimidazole, 1-(3-aminopropyl)imidazole, 1-(3-aminopropyl)-2-methylimidazole, 1-(3-aminopropyl)-2-ethylimidazole, 1-(3-aminopropyl)-2-phenylimidazole, 1-(3-aminopropyl)-2-heptadecylimidazole, 1-(3-aminopropyl)-2,4-dimethylimidazole, 1-(3-aminopropyl)-2,5-dimethylimidazole, 1-(3-aminopropyl)-2-ethyl-4-methylimidazole, 1-(3-aminopropyl)-2-ethyl-5-methylimidazole, 1-(3-aminopropyl)-4-methyl-2-undecylimidazole, and 1-(3-aminopropyl)-5-methyl-2-undecylimidazole.

Non-limiting examples of urea derivatives include, but are not limited to, 3-(3,4-dichlorophenyl)-1,1-dim ethylurea, 3-(4-chlorophenyl)-1,1-dimethylurea, and 3,3'-(4-methyl-1,3-phenylene)bis(1,1-dimethylurea).

In some embodiments, the urea derivative is described by the general formula IV:

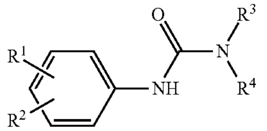

IV wherein:

- $R^1$ and $R^2$ are each independently H, $CH_3$, $OCH_3$, $OC_2H_5$, $NO_2$, halogen, or NH—CO $NR^3R^4$; and
- $R^3$ and $R^4$ are each independently a hydrocarbon group, allyl group, alkoxy group, alkenyl group, aralkyl group, or an alicyclic compound containing both $R^3$ and $R^4$, all containing 1 to 8 carbon atoms.

d) Acrylate Monomer Component

The curable resin blend further comprises acrylate monomer component that will react during the B-staging process. The acrylate monomer component can be a monofunctional acrylate, a multifunctional acrylate, a monofunctional methacrylate, a multifunctional methacrylate, or a combination thereof. The expression "monofunctional acrylate monomer" refers to a monomer having only one acryloyl group per monomer molecule. The expression "multifunctional acrylate monomer" refers to a monomer having two or more acryloyl groups per monomer molecule. The expression "monofunctional methacrylate monomer" refers to a monomer having only one methacryloyl group per monomer molecule. The expression "multifunctional methacrylate monomer" refers to a monomer having two or more methacryloyl groups per monomer molecule. Any of the foregoing can optionally further comprise one or more epoxy groups, one or more hydroxyl groups, one or more anhydride groups or combinations thereof. In some embodiments, such epoxy groups and/or hydroxyl groups can react with the epoxy resin during C-staging to produce crosslinking between the epoxy resin and the polymer formed by polymerization and/or crosslinking of the acrylate monomer component.

In some embodiments, nonlimiting examples of a monofunctional acrylate include, but are not limited to, acrylic acid, alkyl acrylate, or combinations thereof. The alkyl group contained in the alkyl acrylate may be linear or branched. Examples of the alkyl acrylates include, but are not limited to, methyl acrylate, ethyl acrylate, propyl acrylate, n-butyl acrylate, isobutyl acylate, pentyl acrylate, 2-ethylhexyl acrylate, n-stearyl acrylate, isostearyl acrylate, isoamyl acrylate, octyl acrylate, isooctyl acrylate, isononyl acrylate, decyl acrylate, isodecyl acrylate, tridecyl acrylate, isomyristyl acrylate, lauryl acrylate, and mixtures thereof. In some embodiments, the alkyl group contained in the alkyl acrylate can have carbon atoms in the alkyl group in the range of from 1 to 8 or from 1 to 4.

In some embodiments, the monofunctional acrylate has a substituted or unsubstituted alkoxy radical and may be selected from nonlimiting examples such as methoxyethyl acrylate, ethylcarbitol acrylate, (2-methyl-2-ethyl-1,3-dioxolane-4-yl)methyl acrylate, hydroxyethyl acrylate, hydroxypropyl acrylate, 4-hydroxybutyl acrylate, butoxyethyl acrylate, 2-ethylhexyl-diglycol acrylate, 4-hydroxybutyl acrylate, methoxy diethylene glycol acrylate, methoxy triethylene glycol acrylate, ethoxy diethylene glycol acrylate, 2-(2-etoxyetoxy)ethyl acrylate, 2-ethylhexyl carbitol acrylate, and mixtures thereof.

In some embodiments, the monofunctional acrylate has a substituted or unsubstituted monocycloaliphatic hydrocarbon radical and may be selected from nonlimiting examples such as cyclohexyl acrylate, 3,3,5-trimethylcyclohexyl acrylate, 2-(1,1-dimethylethyl)cyclohexyl acrylate, 3-(1,1-dimethyl ethyl)cyclohexyl acrylate, 4-(1,1-dimethylethyl)cyclohexyl acrylate, 4-tert-butylcyclohexyl acrylate, furfuryl acrylate, tetrahydrofurfuryl acrylate, cyclic trimethylolpropane formal acrylate, and mixtures thereof.

In some embodiments, the monofunctional acrylate has a substituted or unsubstituted multicyclic, nonaromatic hydrocarbon radical and may be selected from nonlimiting examples such as isobornyl acrylate, dihydrocyclopentadienyl acrylate, ethoxylated dihydrocyclopentadienyl acrylate, and mixtures thereof.

In some embodiments, the monofunctional acrylate has a substituted or unsubstituted aromatic hydrocarbon radical and may be selected from nonlimiting examples such as phenoxyethyl acrylate, phenoxy ethoxyethyl acrylate, 2-hydroxy-3-phenoxypropyl m acrylate, benzyl acrylate, and mixtures thereof.

In some embodiments, the multifunctional acrylate monomer can be, but is not limited to, 1,10-decanediol diacrylate, 1,12-dodecanol diacrylate, 1,16-hexadecanediol diacrylate, 1,2-ethylene glycol diacrylate, 1,3-butylene glycol diacrylate, 1,4-butanediol diacrylate, 1,5-pentanediol diacrylate, 1,6-hexanediol diacrylate, 1,7-heptanediol diacrylate, 1,8-octanediol diacrylate, 1,9-nonanediol diacrylate, 2-ethyl-2-butyl-propanediol diacrylate, 2-methyl-1,8-octanediol diacrylate, 3-methyl-1,5-pentanediol diacrylate, alkoxylated alkanediol diacrylate, alkoxylated bisphenol A diacrylate, alkoxylated cyclohexanedimethanol diacrylate, alkoxylated hexanediol diacrylate, alkoxylated neopentyl glycol diacrylate, alkoxylated trimethylolpropane triacrylate, batyl alcohol diacrylate, butanediol diacrylate, cyclohexanedimethanol diacrylate, di ethyl ene glycol diacrylate, dimerdiol diacrylate, dioxane glycol diacrylate, dipentaerythritol (penta)hexaacrylate, dipentaerythritol hexaacrylate, dipentaerythritol hexaacrylate, dipentaerythritol pentaacrylate, dipropylene glycol diacrylate, ditrimethylolpropane tetraacrylate, ditrimethylolpropane triacrylate, ester diol diacrylate, ethoxylated bisphenol A diacrylate, ethoxylated pentaerythritol tetraacrylate, ethoxylated trimethylolpropane triacrylate, ethylene glycol diacrylate, ethylene oxide-modified acrylates of these acrylates, glycerol propoxylate triacrylate, hydrogenated bisphenol A diacrylate, hydroxypivalic acid neopentyl glycol diacrylate, (octahydro-4,7-methano-1H-indenediyl)bis(methylene)diacrylate, neopentyl glycol diacrylate, pentaerythritol tetraacrylate, pentaerythritol triacrylate, polycarbonate diol diacrylate, polyethylene glycol diacrylates, propoxylated neopentyl glycol diacrylate, tetraethylene glycol diacrylate, tri cyclodecanedimethanol diacrylate, triethylene glycol diacrylate, trimethylolpropane triacrylate, tripropylene glycol diacrylate, tris(2-hydroxyethyl)isocyanurate triacrylate, trypentaerythritol octaacrylate, 2-norbornyl acrylate, norbornyl acrylate, and mixtures thereof.

In some embodiments, nonlimiting examples of a monofunctional methacrylate include, but are not limited to, acrylic acid, alkyl methacrylate, or combinations thereof. The alkyl group contained in the alkyl methacrylate may be linear or branched. Examples of the alkyl methacrylates include, but are not limited to, methyl methacrylate, ethyl methacrylate, propyl methacrylate, n-butyl methacrylate, isobutyl acylate, pentyl methacrylate, 2-ethylhexyl methacrylate, n-stearyl methacrylate, isostearyl methacrylate, isoamyl methacrylate, octyl methacrylate, isononyl methacrylate, decyl methacrylate, isodecyl methacrylate, isomyristyl methacrylate, and mixtures thereof. In some embodiments, the alkyl group contained in the alkyl methacrylate can have carbon atoms in the alkyl group in the range of from 1 to 8 or from 1 to 4.

In some embodiments, the monofunctional methacrylate has a substituted or unsubstituted alkoxy radical and may be selected from nonlimiting examples such as methoxyethyl methacrylate, ethylcarbitol methacrylate, (2-methyl-2-ethyl-1,3-dioxolane-4-yl)methyl methacrylate, hydroxyethyl methacrylate, hydroxypropyl methacrylate, 4-hydroxybutyl methacrylate, butoxyethyl methacrylate, 2-ethylhexyl-diglycol methacrylate, 4-hydroxybutyl methacrylate, methoxy diethylene glycol methacrylate, methoxy triethylene glycol methacrylate, ethoxy diethylene glycol methacrylate, 2-(2-etoxyetoxy)ethyl methacrylate, 2-ethylhexyl carbitol methacrylate, and mixtures thereof.

In some embodiments, the monofunctional methacrylate has a substituted or unsubstituted monocycloaliphatic hydrocarbon radical and may be selected from nonlimiting examples such as cyclohexyl methacrylate, 3,3,5-trimethylcyclohexyl methacrylate, 2-(1,1-dimethylethyl)cyclohexyl methacrylate, 3-(1,1-dimethylethyl)cyclohexyl methacrylate, 4-(1,1-dim ethyl ethyl)cyclohexyl methacrylate, 4-tert-butylcyclohexyl methacrylate, furfuryl methacrylate, tetrahydrofurfuryl methacrylate, cyclic trimethylolpropane formal methacrylate, and mixtures thereof.

In some embodiments, the monofunctional methacrylate has a substituted or unsubstituted multicyclic, nonaromatic hydrocarbon radical and may be selected from nonlimiting examples such as isobornyl methacrylate, dihydrocyclopentadienyl methacrylate, ethoxylated dihydrocyclopentadienyl methacrylate, and mixtures thereof.

In some embodiments, the monofunctional methacrylate has a substituted or unsubstituted aromatic hydrocarbon radical and may be selected from nonlimiting examples such as phenoxyethyl methacrylate, phenoxy ethoxyethyl methacrylate, 2-hydroxy-3-phenoxypropyl m methacrylate, benzyl methacrylate, and mixtures thereof.

In some embodiments, the multifunctional methacrylate monomer can be, but is not limited to, 1,10-decanediol dimethacrylate, 1,12-dodecanol dimethacrylate, 1,16-hexadecanediol dimethacrylate, 1,2-ethylene glycol dimethacrylate, 1,3-butylene glycol dimethacrylate, 1,4-butanediol dimethacrylate, 1,5-pentanediol dimethacrylate, 1,6-hexanediol dimethacrylate, 1,7-heptanediol dimethacrylate, 1,8-octanediol dimethacrylate, 1,9-nonanediol dimethacrylate, 2-ethyl-2-butyl-propanediol dimethacrylate, 2-methyl-1,8-octanediol dimethacrylate, 3-methyl-1,5-pentanediol dimethacrylate, alkoxylated alkanediol dimethacrylate, alkoxylated bisphenol A dimethacrylate, alkoxylated cyclohexanedimethanol dimethacrylate, alkoxylated hexanediol dimethacrylate, alkoxylated neopentyl glycol dimethacrylate, alkoxylated trimethylolpropane trimethacrylate, batyl alcohol dimethacrylate, butanediol dimethacrylate, cyclohexanedimethanol dimethacrylate, diethylene glycol dimethacrylate, dimerdiol dimethacrylate, dioxane glycol dimethacrylate, dipentaerythritol (penta)hexamethacrylate, dipentaerythritol hexamethacrylate, dipentaerythritol hexamethacrylate, dipentaerythritol pentamethacrylate, dipropylene glycol dimethacrylate, ditrimethylolpropane tetramethacrylate, ditrimethylolpropane trimethacrylate, ester diol dimethacrylate, ethoxylated bisphenol A dimethacrylate, ethoxylated pentaerythritol tetramethacrylate, ethoxylated trimethylolpropane trimethacrylate, ethylene glycol dimethacrylate, ethylene oxide-modified methacrylates of these methacrylates, glycerol propoxylate trimethacrylate, hydrogenated bisphenol A dimethacrylate, hydroxypivalic acid neopentyl glycol dimethacrylate, (octahydro-4,7-methano-1H-indenediyl)bis(methylene)dimethacrylate, neopentyl glycol dimethacrylate, pentaerythritol tetramethacrylate, pentaerythritol trimethacrylate, polycarbonate diol dimethacrylate, polyethylene glycol dimethacrylates, propoxylated neopentyl glycol dimethacrylate, tetraethylene glycol dimethacrylate, tri cyclodecanedimethanol dimethacrylate, triethylene glycol dimethacrylate, trimethylolpropane trimethacrylate, tripropylene glycol dimethacrylate, tris(2-hydroxyethyl)isocyanurate trimethacrylate, trypentaerythritol octamethacrylate, 2-norbornyl methacrylate, norbornyl methacrylate, and mixtures thereof.

In some embodiments, an acrylate monomer component comprises an epoxy group. Examples of the epoxy group-containing acrylate monomers include, but are not limited to, glycidyl methacrylate, glycidyl α-ethylacrylate, 3,4-epoxybutyl methacrylate, 3,4-epoxycyclohexylmethyl methacrylate, glycidyl acrylate, 3,4-epoxybutyl acrylate, 3,4-epoxycyclohexylmethyl acrylate, or a combination thereof.

In some embodiments, an acrylate monomer component comprises a hydroxyl group. Examples of the hydroxy group-containing acrylate monomers include, but are not limited to, hydroxy ethyl acrylate, hydroxy ethyl methacrylate, or a combination thereof e) Free-Radical Initiator Examples of suitable free radical initiators include hydrogen peroxide, tert-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of from 0.01% to 15%, from 0.1% to 5%, or from 1% to 3%, by weight based on the total weight of the curable resin blend.

In some embodiments, suitable organic peroxides include, but are not limited to, dicumyl peroxide; n-butyl-4,4-di(t-butylperoxy) valerate; 1,1-di(t-butylperoxy)3,3,5-trimethyl-cyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy) hexyne-3; di(2-t-butyl-peroxyisopropyl)benzene; dilauroyl peroxide; dibenzoyl peroxide; t-butyl hydroperoxide; and combinations thereof.

Examples of suitable free-radical generators include, for example, peroxy compounds (such as, for example, peroxides, persulfates, perborates and percarbonates), azo compounds and the like. Specific examples include hydrogen peroxide, di(decanoyl)peroxide, dilauroyl peroxide, t-butyl perneodecanoate, tert-butyl peroxyneodecanoate, 1,1-dimethyl-3-hydroxybutyl peroxide-2-ethyl hexanoate, di(t-butyl)peroxide, t-butylperoxydiethyl acetate, t-butyl peroctoate, t-butyl peroxy isobutyrate, t-butyl peroxy-3,5,5-trimethyl hexanoate, t-butyl perbenzoate, t-butyl peroxy pivulate, t-amyl peroxy pivalate, t-butyl peroxy-2-ethyl hexanoate, lauroyl peroxide, cumene hydroperoxide, t-butyl hydroperoxide, azo bis(isobutyronitrile), 2,2'-azo bis(2-methylbutyronitrile), and the like.

In some embodiments, suitable free radical initiators may be peroxides, azo compounds, or combinations thereof. In some embodiments, the free radical initiator comprises halogen-free peroxides, such as, but not limited to, permaleate, dilauroyl peroxide, dibenzoyl peroxide, tert-butyl peroctoate, di(tert-butyl)peroxide (DTBP), di(tert-amyl)peroxide (DTAP), tert-butyl peroxy(2-ethylhexyl) carbonate (TBPEHC) and other peroxides that decompose at high temperature.

f) Toughening Agent

Toughening agents can be added to provide the desired overlap shear, peel resistance, and impact strength. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured epoxy composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the tradenames ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a pre-dispersed blend with a diglycidyl ether of bisphenol A at, for example, a ratio of 12 to 37 parts by weight of the core-shell polymer and are available under the tradenames KANE ACE (e.g., KANE ACE MX 157, KANE ACE MX 257, and KANE ACE MX 125) from Kaneka Corporation (Japan).

Another class of polymeric toughening agents that are capable of forming, with the epoxy component, a rubbery phase on curing, are carboxyl-terminated butadiene acrylonitrile compounds. Commercially available carboxyl-terminated butadiene acrylonitrile compounds include those available under the tradenames HYCAR (e.g., HYCAR 1300X8, HYCAR 1300X13, and HYCAR 1300X17) from Lubrizol Advanced Materials, Inc. (Cleveland, Ohio) and under the tradename PARALOID (e.g., PARALOID EXL-2650) from Dow Chemical (Midland, Mich.).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is prepared so as to constitute from 95 wt. % to 40 wt. % of the total graft polymer, so that the polymerized thermoplastic portion constitutes from 5 wt. % to 60 wt. % of the graft polymer.

Still other polymeric toughening agents are polyether sulfones such as those commercially available from BASF (Florham Park, N.J.) under the tradename ULTRASON (e.g., ULTRASON E 2020 P SR MICRO).

Examples of the toughening agent include, without limitation, polyamides, copolyamides, polyimides, aramids, polyketones, polyetheretherketones, polyarylene ethers, polyesters, polyurethanes, polysulphones, polyethersulphones, high performance hydrocarbon polymers, liquid crystal polymers, PTFE, elastomers, segmented elastomers such as reactive liquid rubbers based on homo or copolymers of acrylonitrile, butadiene, styrene, cyclopentadiene, acrylate, polyurethane rubbers, and polyether sulphone (PES) or core shell rubber particles.

When a blend of core shell elastomer particles and epoxy resin, and/or an elastomer/epoxy adduct in admixture with an epoxy resin, is used in the formulations of the present invention, the amount of toughener is expressed as the amount of the core shell elastomer particles and/or elastomer epoxy adduct present in the formulation not including the epoxy resin component. For example, a formulation comprising 20 wt. % of a blend of core shell rubber particles in epoxy resin, in which the core shell rubber particles comprise 25% by weight of the blend, is considered to comprise 5% core shell elastomer particles by weight of the formulation.

In some embodiments, the one or more thermoplastic toughening agents comprises a phenoxy resin, a polyvinyl butyral resin, a thermoplastic fluoropolymer, an ethylene vinyl acetate copolymer or a poly(aryl ether sulfone), more preferably the one or more thermoplastic toughening agents comprises a phenoxy resin.

A phenoxy resin is a thermoplastic polymer derived from bisphenol A, and is a polyhydroxyether, with ether linkages along the polymer backbone and pendant hydroxyl groups. One useful phenoxy resin is the reaction product of a phenol based difunctional epoxy resin and a difunctional phenol (for example the reaction product of bisphenol A epoxy with bisphenol A). A similar material may also be synthesized directly from a bisphenol (for example bisphenol A) and epichlorohydrin. The terminal epoxy group may be ring opened to generate a terminal alpha glycol group. The phenoxy resins typically have weight-average molecular weights of at least about 5,000, at least about 25,000 and/or at least about 50,000 but less than about 100,000, less than about 75,000 and/or less than about 60,000. Examples of useful phenoxy resins include PAPHEN Phenoxy Resin PKHH, PKHC, PKHB and PKHJ, from Gabriel Performance Products, and phenoxy resins available from Kukdo, such as Phenoxy YP50. Examples of suitable polyvinyl butyral resins include Butvar resins (available from Eastman Chemical Company, examples of suitable thermoplastic fluoropolymers include polyvinyl fluorides, examples of suitable ethylene vinyl acetate copolymers include Elvax polymers (available from DuPont), and examples of suitable poly(aryl ether sulfones) include polyethersulphones, polyphenylsulfones and polyethersulfone-ethersulfone copolymers.

g) Reactive Diluent

As used herein, a reactive diluent is a compound which reduces the initial viscosity of the epoxy-resin blend composition or of the composite material produced therefrom. During the course of curing the composite material, a reactive diluent enters into chemical bonding with the developing network made of epoxy resin and latent hardener.

In some embodiments, reactive diluents are low-molecular-weight organic compounds, or low-molecular-weight organic aliphatic compounds having from 1 to 10 carbon atoms and having one or more epoxy groups. Reactive diluents can also be cyclic carbonates, in particular cyclic carbonates having from 1 to 10 carbon atoms, for example ethylene carbonate, propylene carbonate, glycerol carbonate, butylene carbonate, or vinylene carbonate. In some embodiments, reactive diluents are those selected from the group consisting of ethylene carbonate, vinylene carbonate, propylene carbonate, glycerol carbonate, 1,4-butanediol diglycidyl ether, 1,6-hexanediol diglycidyl ether, glycidyl neodecanoate, glycidyl versatate, 2-ethylhexyl glycidyl ether, neopentyl glycol diglycidyl ether, p-tert-butyl glycidyl ether, butyl glycidyl ether, $C_8$-$C_{10}$-alkyl glycidyl ether, $C_{12}$-$C_{14}$-alkyl glycidyl ether, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether, glycerol triglycidyl ether, triglycidylpara-aminophenol, divinylbenzyl dioxide, and dicyclopentadiene diepoxide. Particular preference is given to those selected from the group consisting of 1,4-butanediol bisglycidyl ether, 1,6-hexanediol bisglycidyl ether, 2-ethylhexyl glycidyl ether, $C_8$-$C_{10}$-alkyl glycidyl ether, $C_{12}$-$C_{14}$-alkyl glycidyl ether, neopentyl glycol diglycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, trimethylolpropane triglycidyl ether, glycerol triglycidyl ether, divinylbenzyl dioxide, and dicyclopentadiene diepoxide. They are in particular those selected from the group consisting of 1,4-butanediol disglycidyl ether, $C_8$-$C_{10}$-alkyl monoglycidyl ether, $C_{12}$-$C_{14}$-alkyl monoglycidyl ether, 1,6-hexanediol bisglycidyl ether, neopentyl glycol diglycidyl ether, trimethylolpropane triglycidyl ether, glycerol triglycidyl ether, divinylbenzene dioxide, and dicyclopentadiene diepoxide.

2. Filler Component

Fillers, also referred to as extenders, not only reduce the cost of composites, but also frequently impart performance improvements that might not otherwise be achieved by the reinforcement and resin ingredients alone. Fillers are the least expensive of the major ingredients in the precursor composition to the molding compound and can improve mechanical properties such as fire and smoke performance by reducing organic content in the final composite material. Mechanical properties, including water resistance, weathering, surface smoothness, stiffness, dimensional stability, and temperature resistance, can all be improved through use of fillers. Additionally, filled acrylate-epoxy resins shrink less than unfilled resins, thereby improving the dimensional control of molded parts. A filler component that may be included in the precursor composition to a molding compound as described herein can be selected from particulate fillers such as, but not limited to, talc, clays, calcium silicate, aluminum oxide, aluminum hydroxide, modified montmorillonite, alumina, glasses (silicate, borosilicate, aluminosilicate, etc.), ceramics (e.g., nitrides, oxides, or carbides, such as aluminum nitride, boron nitride, silicon nitride, aluminum carbide, boron carbide, silicon carbide, silica, or mixtures thereof), polymorphs of carbon (e.g., from diamond to graphite/graphene to carbon black or amorphous soot), metals (e.g., aluminum, copper, nickel, silver, zinc), metal oxides, carbonates or hydrated oxides (e.g., calcium carbonate, calcium oxide, magnesium carbonate, zinc oxide, zirconia, and the like), and synthetic or natural organic polymers or other natural fillers (e.g., such as ground nut shell, ground feathers, and the like), ceramic microspheres, titania, zirconia, alumina trihydrate, magnesium oxide, magnesium hydroxide, silica-coated aluminum nitride, quartz, microballoons, glass microspheres, silicon carbide, graphite, carbon black, barium sulfate, aluminum, stainless steel, iron, nickel, tungsten, silver, various nanoparticles, and combinations thereof.

In some embodiments, the total of selected additives, whether a single additive or a combination of additives, is in the range of from greater than 0 to 80 wt. %, from 10 wt. % to 70 wt. %, from 15 wt. % to 60 wt. %, or from 20 wt. % to 50 wt. %.

3. Additives

Additives that may be included in the precursor composition to a molding compound as described herein can be selected heat stabilizers, UV stabilizers, pH modifiers (sodium hydroxide solution), particle size modifiers (sodium sulfate), biocides, mold release agents, wetting and dispersing additives, deaerating additives, shrinkage modifiers, flame retardants, pigments, and mixtures thereof. These additives make it possible modify the rheological, chemical, and/or adhesion properties of the acrylate-epoxy resin matrix in the final composite material formed from the precursor composition to a molding compound.

In some embodiments, a mold release agent may be used to reduce the adhesion between the mold and ultimate composite material, to allow the molded part to be extracted from the press without being damaged. A mold release agent may be external (wax or lubricant applied to the surface of the mold) or internal. For example, the precursor composition to a molding compound according to this disclosure may comprise an internal mold release agent selected from metal stearates, such as, but not limited to, calcium stearates, zinc stearates, aluminum stearates, or magnesium stearates, or a combination thereof. Examples of other internal mold release agents include fatty acids having 16 or more carbon atoms in one embodiment and 18 carbon atoms to 36 carbon atoms in another embodiment. Also useful in the present invention can be internal mold release agents such as alkali metal or ammonium salts, monoalkyl esters, monoalkylamides and di- and/or tri-glycerides of such fatty acids; and mixtures thereof.

Flame retardants are typically provided for safety purposes. In some embodiments, a flame retardant system comprises a bromine-containing flame retardant (such as, but not limited to, brominated diphenyl ethers), an antimony oxide flame retardant (such as, but not limited to, antimony trioxide), aluminum trihydroxide (ATH), magnesium hydroxide, or a combination thereof.

In some embodiments, the total of selected additives, whether a single additive or a combination of additives, is in the range of from greater than 0 to 50 wt. %, from 5 wt. % to 40 wt. %, or from 10 wt. % to 30 wt. %.

II. Molding Compound

In another aspect of the present disclosure, B-staging is performed on the molding compound precursor compositions to form an SMC or BMC. In particular, any of the above described molding compound precursor compositions can be added and/or mixed with at least one fiber component (described below) in the B-staged to form a semi-solid molding compound by heating the composition to a temperature in the range of from 50° C. to 120° C., from 55° C. to 115° C., or from 60° C. to 110° C., for a time period in the range of from 5 minutes to 30 minutes, from 8 minutes to 20 minutes, or from 10 minutes to 15 minutes.

One of ordinary skill in the art could select from these ranges to accomplish polymerization and/or crosslinking of at least a majority, substantially all, or all of the acrylate monomer component, based on the type and amount of acrylate monomer component and type and amount of free radical initiator selected in a particular embodiment.

1. Fiber Component

The fiber component for the composite materials include, but are not limited to, glass, carbon, polymers such as poly amide (aramid) or polyesters, natural fibers, or mineral fiber materials such as basalt fibers or ceramic fibers, individually or of mixtures, or of multiple plies of various fiber types. Suitable glass fibers, or glass-based reinforcing fibers, include, but are not limited to E glass, S glass, R glass, M glass, C glass, ECR glass, D glass, AR glass, or hollow glass fibers. In some embodiments, the fiber component is dispersed in the molding compound precursor composition and comprises glass fibers, carbon fibers, or a combination thereof. A fiber component may comprise inorganic and/or organic fibers, for example glass fibers, carbon fibers, synthetic fibers, natural fibers from plant and/or animal sources, chopped fibers, microfibers, mineral fibers, milled fibers, and/or whiskers; reinforcing silicas, including fumed or fused silica; ceramic fiber whiskers.

Carbon fibers are used in high-performance composites, where another important factor is the lower density compared to glass fibers with simultaneously high strength. Carbon fibers are composed of carbonaceous starting materials which are converted by pyrolysis to carbon in a graphite-like arrangement. A distinction is made between isotropic and anisotropic types. Isotropic fibers have only low strengths and lower industrial significance. Anisotropic fibers exhibit high strengths and rigidities with simultaneously low elongation at break.

Short reinforcement fibers are short fiber sections with an average length of from cm to 5.0 cm. For use in SMC, it is preferable to use fiber sections with an average length of from 1.2 to 5.0 cm. For use in BMC, it is preferable to use fiber sections with an average length of from 0.3 cm to 2.5 cm. In some embodiments, average length of the short reinforcement fibers has a standard deviation of less than or equal to 10%, less than or equal to 5%, or less than or equal to 2%, of the average length. In some embodiments of the present disclosure, long fibers are chopped immediately before being added to the molding compound precursor composition.

In some embodiments, the total of selected fiber component, whether a single fiber or a combination of fibers, is in the range of from greater than 0 to 80 wt. %, from 10 wt. % to 70 wt. %, from 15 wt. % to 60 wt. %, or from 20 wt. % to 50 wt. %.

III. Composite Material

In another aspect of the present disclosure, C-staging is performed on the SMC or BMC molding compound to form a composite material. In particular, any of the above described molding compounds can be C-staged to form a substantially rigid shaped article of composite material. A SMC or BMC is first cut, trimmed, or otherwise suitably prepared for placement into a selected mold. Preparation of the SMC or BMC should allow closure of the mold after placement of the prepared molding compound in the mold and also provide enough molding compound to fill the cavity formed by the closed mold.

The closed mold subjects the molding compound to a pressure greater than or equal to psig (34.5 kPa), greater than or equal to 10 psig (68.9 kPa), or greater than or equal to 15 psig (103 kPa). Pressure is maintained while temperature is increased to promote the curing of at least a majority, substantially all, or all of the epoxy resin to form a composite material having a low porosity. In some embodiments, the curing temperature is greater than or equal to 120° C., greater than or equal to 140° C., greater than or equal to 160° C., or greater than or equal to 180° C. In some embodiments, the time for applying the curing temperature under pressure is greater than or equal to 10 minutes, greater than or equal to 15 minutes, greater than or equal to 20 minutes, or greater than or equal to 25 minutes. Curing time and temperature are a function of the selected latent hardener. Also, there is a trade-off between time and temperature—i.e., equivalent curing can be accomplished in less time at a higher temperature.

In some embodiments, extremely fast curing times are possible, such as less than 10 minutes, less than 5 minutes, or less than three minutes, where curing temperature is greater than or equal to 150° C., greater than or equal to 160° C., greater than or equal to 170° C., greater than or equal to 180° C., One of ordinary skill in the art could select from these ranges to accomplish crosslinking of at least a majority, substantially all, or all of the epoxy resin, based on the type and amount of acrylate monomer component and type and amount of free radical initiator selected in a particular embodiment.

IV. Preparation of a Composite Material

1. Preparation of Curable Resin Blend

The components of the curable resin blend can be added in any order and are mixed at a temperature of less than or equal to 50° C., less than or equal to 40° C., less than or equal to 30° C., or less than or equal to 25° C. Mixing can be performed manually or by any mixing apparatus provided that the agitation of the mixing does not raise the temperature of the curable resin blend to a level sufficient to initiate partial curing and B-staging.

2. Preparation of Molding Compound Precursor Composition (A-staging)

In some embodiments, the optional filler component (as described above) and/or one or more additives (as described above) are added to the curable resin blend. Mixing can be performed manually or by any mixing apparatus provided that the agitation of the mixing does not raise the temperature of the curable resin blend to a level sufficient to initiate partial curing and B-staging. Mixing is continued as needed to assure proper wetting and uniform distribution and suspension of the optional filler and/or additives in the curable resin blend matrix to form the molding compound precursor composition. In some embodiments, the curable resin and/or the molding compound precursor composition remain in a liquid state throughout the mixing process. In some embodiments, the molding compound precursor composition has a pot life of at least 12 hours, at least 18 hours, or at least 24 hours.

3. Preparation of Molding Compound (B-Staging)

In this stage, at least one fiber component is added to or mixed with the liquid molding compound precursor composition and formed into a desired shape, such as, but not limited to, a sheet (in the case of a SMC) or a 3-dimensional shape (in the case of a BMC). The formed composition is then heated to a temperature of greater than or equal to 50° C., greater than or equal to 60° C., greater than or equal to 70° C., or greater than or equal to 80° C. in order to trigger partial curing of the molding compound to form a solid but flexible sheet or preform. This heating step is limited to less than or equal to 120° C., less than or equal to 110° C., less than or equal to 100° C., or less than or equal to 95° C., in order not to initiate curing of the epoxy resin.

In some embodiments, the molding compound is heated in the B-stage for less than 1 hour, or less than 45 minutes, or 30 minutes or less. In other embodiments, the molding compound is heated in the B-stage for at least 20 minutes, or between about 20 and about 30 minutes, or between about 20 and about 45 minutes. The fast B-staging time, also called maturation time, for the presently disclosed curable composition is much quicker than curable compositions that do not include the acrylate or methacrylate monomers, which can take at least 2 to 5 days to mature. This reduction in partial curing time greatly increases productivity as it shortens the fabrication time of the molding compound. At this stage, the partially cured SMC or BMC, consisting of a, semi-solid, can be stored at room temperature (about 19° C. to about 30° C.) for one month, two months, or three months.

4. Preparation of Composite Material (C-Staging)

In this stage, the semi-solid molding compound is molded and fully cured to form a substantially rigid composite material. Compression molding is a manufacturing technique that requires a two-part mold. The first part holds the flexible partially cured composite material or "charge." The second part is mounted on a press to close the cavity between the two parts, which contains the charge, while applying high pressure. Due to complex geometry, it may be necessary to cut and/or trim the sheets or other pre-formed shape of the molding compound to place them more easily in the lower mold. Then, while the upper mold cavity is closing, the material is pushed throughout the mold until closed.

The closed mold subjects the molding compound to a pressure greater than or equal to 5 psig (34.5 kPa), greater than or equal to 10 psig (68.9 kPa), or greater than or equal to 15 psig (103 kPa). Pressure is maintained while temperature is increased to promote the curing of at least a majority, substantially all, or all of the epoxy resin to form a composite material having a low porosity. In some embodiments, the curing temperature is greater than or equal to 120° C., greater than or equal to 140° C., greater than or equal to 160° C., or greater than or equal to 180° C. In some embodiments, the time for applying the curing temperature under pressure is greater than or equal to 10 minutes, greater than or equal to 15 minutes, greater than or equal to 20 minutes, or greater than or equal to 25 minutes. Curing time and temperature are a function of the selected latent hardener. Also, there is a trade-off between time and temperature—i.e., equivalent curing can be accomplished in less time at a higher temperature.

In some embodiments, extremely fast curing times are possible, such as less than 10 minutes, less than 5 minutes, or less than three minutes, where curing temperature is greater than or equal to 150° C., greater than or equal to 160° C., greater than or equal to 170° C., greater than or equal to 180° C. The fully cured composite material is a substantially rigid article having the shape of the cavity formed by the mold.

V. Certain Embodiments

In some embodiments, the curable resin blend comprises an epoxy resin composition, a latent hardener, a crosslinking accelerator, an acrylate monomer component, and a free radical initiator. In some embodiments, the components of the curable resin blend are mixed at a temperature in the range of from 20° C. to 30° C. In some embodiments, the acrylate monomer component is selected from the group consisting of an acrylate, an acrylate derivative, methacrylate, a methacrylate derivative, or a combination thereof.

In a first group of embodiments, in addition to the foregoing attributes of the curable resin blend, the epoxy resin composition comprises a bisphenol-epoxy resin, a novolac-epoxy resin, a cycloaliphatic resin, or a combination thereof. In further embodiments the epoxy resin composition is present in an amount in the range of from 20 wt. % to 90 wt. %, from 25 wt. % to wt. %, or from 30 wt. % to 80 wt. %

In some embodiments, in addition to the foregoing attributes of the first group of embodiments, the latent hardener comprises a member selected from the group consisting of an anhydride compound, a guanidine compound, or a combination thereof. In further embodiments the latent hardener is present in an amount in the range of from 1 wt. % to 50 wt. %, 2 wt. % to wt. %, or 3 wt. % to 40 wt. %.

In some embodiments, in addition to one or more of the foregoing attributes of the first group of embodiments, the crosslinking accelerator comprises a member selected from the group consisting of an imidazole compound, a urea derivative, or a combination thereof. In further embodiments the crosslinking accelerator is present in an amount in the range of from 0.1 wt. % to 5 wt. %, 0.5 wt. % to 4 wt. %, or 1 wt. % to 3 wt. %.

In some embodiments, in addition to one or more of the foregoing attributes of the first group of embodiments, the acrylate monomer component is selected from the group consisting of an acrylate, an acrylate derivative, methacrylate, a methacrylate derivative, or a combination thereof. In some embodiments, in addition to one or more acrylate groups, the acrylate monomer component further comprises one or more epoxy groups. In further embodiments the acrylate monomer component is present in an amount in the range of from 10 wt. % to 70 wt. %, 12 wt. % to 50 wt. %, or 14 wt. % to 30 wt. %.

In some embodiments, in addition to one or more of the foregoing attributes of the first group of embodiments, the free radical initiator is present in an amount in the range of from 0.1 wt. % to 5 wt. %, 0.5 wt. % to 4 wt. %, or 1 wt. % to 3 wt. %.

In some embodiments, in addition to one or more of the foregoing attributes of the first group of embodiments, a toughening agent is present in an amount in the range of from 0 wt. % to wt. %.

In some embodiments, in addition to one or more of the foregoing attributes of the first group of embodiments, a reactive diluent in an amount in the range of from 0 wt. % to 10 wt. %.

In some embodiments, in addition to one or more of the foregoing attributes of the first group of embodiments, a filler is present in an amount in the range of from 0 wt. % to 50 wt. %.

In the first group of embodiments, all weight percentages are based on the total weight of the curable resin blend.

In a second group of embodiments, in addition to the foregoing attributes of the curable resin blend, the epoxy resin composition comprises or alternatively consists essentially of a bisphenol-epoxy resin. In further embodiments the epoxy resin composition is present in an amount in the range of from 60 wt. % to 90 wt. %, 65 wt. % to 85 wt. %, or 70 wt. % to 80 wt. %.

In some embodiments, in addition to the foregoing attributes of the second group of embodiments, the latent hardener comprises or alternatively consists essentially of a guanidine compound, or a combination thereof. In further embodiments the latent hardener is present in an amount in the range of from 2 wt. % to 10 wt. %, 3 wt. % to 8 wt. %, or 4 wt. % to 6 wt. %.

In some embodiments, in addition to one or more of the foregoing attributes of the second group of embodiments, the acrylate monomer component is selected from the group consisting of an acrylate, an acrylate derivative, methacrylate, a methacrylate derivative, or a combination thereof. In further embodiments the acrylate monomer component is present in an amount in the range of from 10 wt. % to 70 wt. %, 12 wt. % to 50 wt. %, or 14 wt. % to 25 wt. %.

In some embodiments, in addition to one or more of the foregoing attributes of the second group of embodiments, the crosslinking accelerator comprises or consists essentially of a urea derivative. In further embodiments the crosslinking accelerator is present in an amount in the range of from 0.2 wt. % to 4 wt. %, 0.5 wt. % to 3 wt. %, or 1 wt. % to 2 wt. %.

In some embodiments, in addition to one or more of the foregoing attributes of the second group of embodiments, the free radical initiator is present in an amount in the range of from 0.1 wt. % to 3 wt. %, 0.5 wt. % to 1.5 wt. %, or 1.0 wt. % to 2 wt. %.

In some embodiments, in addition to one or more of the foregoing attributes of the second group of embodiments, a toughening agent is present in an amount in the range of from 0 wt. % to 10 wt. %.

In some embodiments, in addition to one or more of the foregoing attributes of the second group of embodiments, a filler is present in an amount in the range of from 0 wt. % to 50 wt. %.

In some embodiments, in addition to one or more of the foregoing attributes of the second group of embodiments, a reactive diluent in an amount in the range of from 0 wt. % to wt. %.

In the second group of embodiments, all weight percentages are based on the total weight of the curable resin blend.

In a third group of embodiments, in addition to the foregoing attributes of the curable resin blend, the epoxy resin composition comprises or alternatively consists essentially of a novolac-epoxy resin. In further embodiments the epoxy resin composition is present in an amount in the range of from 20 wt. % to 60 wt. %, 25 wt. % to 55 wt. %, or 30 wt. % to 50 wt. %.

In some embodiments, in addition to the foregoing attributes of the third group of embodiments, the latent hardener comprises or alternatively consists essentially of nadic methyl anhydride. In further embodiments the latent hardener is present in an amount in the range of from wt. % to 60 wt. %, 25 wt. % to 55 wt. %, or 30 wt. % to 50 wt. %.

In some embodiments, in addition to one or more of the foregoing attributes of the third group of embodiments, the acrylate monomer component is selected from the group consisting of an acrylate, an acrylate derivative, methacrylate, a methacrylate derivative, or a combination thereof. In further embodiments, the acrylate monomer component is present in an amount in the range of from 10 wt. % to 70 wt. %, 12 wt. % to 50 wt. %, or 14 wt. % to 25 wt. %.

In some embodiments, in addition to one or more of the foregoing attributes of the third group of embodiments, the crosslinking accelerator comprises or alternatively consists essentially of an imidazole compound. In further embodiments the crosslinking accelerator is present in an amount in the range of from 0.2 wt. % to 4 wt. %, 0.5 wt. % to 3 wt. %, or 1 wt. % to 2 wt. %.

In some embodiments, in addition to one or more of the foregoing attributes of the third group of embodiments, the free radical initiator is present in an amount in the range of from 0.1 wt. % to 3 wt. %, 0.5 wt. % to 1.5 wt. %, or 1.0 wt. % to 2 wt. %.

In some embodiments, in addition to one or more of the foregoing attributes of the third group of embodiments, a toughening agent is present in an amount in the range of from 0 wt. % to wt. %.

In some embodiments, in addition to one or more of the foregoing attributes of the third group of embodiments, a reactive diluent is present in an amount in the range of from 0 wt. % to 10 wt. %.

In some embodiments, in addition to one or more of the foregoing attributes of the third group of embodiments, a filler is present in an amount in the range of from 0 wt. % to 50 wt. %.

In the third group of embodiments, all weight percentages are based on the total weight of the curable resin blend.

In further embodiments of the first, second, and third groups of embodiments, in addition to one or more of the foregoing attributes in each group of embodiments, the curable resin blend is characterized by one or more of the following:

(A) the bisphenol-epoxy resin, comprises the reaction product of a bisphenol resin, such as bisphenol A, and epichlorohydrin, and the bisphenol resin in some further embodiments has one or more of:
  (1) a viscosity at 25° C. in the range of from 2,000 mPa·s to 17,000 mPa·s;
  (2) a density at 25° C. in the range of from 1.10 g/ml to 1.20 g/ml; and
  (3) a hydrolyzable chlorine content in the range of from 400 ppm to 600 ppm; and/or, (B) the novolac-epoxy resin, comprises the reaction product of a novolac resin and epichlorohydrin, and the novolac resin in some further embodiments has one or more of:
  (1) an epoxide equivalent weight in the range of from 100 g/eq to 250 g/eq;
  (2) a viscosity at a temperature above ~40° C. in the range of from 20,000 mPa·s to 50,000 mPa·s;

(3) a density at 25° C. in the range of from 1.15 g/ml to 1.25 g/ml; and (4) a hydrolyzable chlorine content in the range of from 1,400 ppm to 1,600 ppm; and/or, (C) the anhydride compound is selected from the group consisting of methylhexahydrophthalic anhydride (MHHPA), nadic methyl anhydride (NMA), dodecenyl succinic anhydride (DD S A), methyltetrahydrophthalic anhydride (MTHPA), hexahydrophthalic anhydride (HHPA), or a combination thereof; and/or, (D) the guanidine compound comprises one or more substituted or unsubstituted guanidines, and in further embodiments the one or more substituted guanidines is selected from the group consisting of methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and cyanoguanidine (dicyandiamide), alkylated benzoguanamine resins, benzoguanamine resins, methoxymethylethoxymethylbenzoguanamine. or a combinations thereof; and/or, (E) the acrylate monomer component has at least one of: a molecular weight of less than or equal to 300 g/mol; and a viscosity of less than or equal to 1,000 cps at and/or, (F) the acrylate monomer component is selected from the group consisting of an acrylate, an acrylate derivative, methacrylate, a methacrylate derivative, or a combination thereof; and/or, (G) the imidazole compound is selected from the group consisting of imidazole, 1-methylimidazole, 2-methylimidazole, 2-ethylimidazole, 2-isopropylimidazole, 2-n-propylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-isopropyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4-methyl-5-hydroxymethylimidazole, 2-phenylimidazole, 2-phenyl-4,5-dihydroxymethylimidazole, 1,2-phenyl-4-methyl-1-dodecyl-2-methylimidazole and 1-cyanoethyl-2-phenyl-4,5-di(2-cyanoethoxy) methylimidazole; and/or, (H) the urea derivative is selected from the group consisting of as 1,1-dimethyl-3-phenylurea (fenuron), 3,3'-(4-methyl-1,3-phenylene)bis(1,1-dimethylurea), methylene diphenlyene bis(dimethylurea), or combinations thereof; and/or, (I) the free radical initiator is selected from the group consisting of a peroxide compound, an azo compound, or a combination thereof, and in further embodiments is tert-butyl peroxyneodecanoate; and/or, (J) the toughening agent comprises a polymeric compound having both a rubbery phase and a thermoplastic phase or capable of forming both a rubbery phase and a thermoplastic phase on curing; and/or, (K) the reactive diluent comprises organic aliphatic compounds having from 1 to 10 carbon atoms and one or more epoxy groups, cyclic carbonates having from 1 to 10 carbon atoms, or a combination thereof.

In another aspect, a molding compound is provided, wherein the molding compound comprises a molding compound precursor composition that is a curable resin blend (as described above) and at least one fiber component, wherein the fiber component is dispersed in the resin composition. The curable resin blend is selected from the above first group of embodiments, second group of embodiments, or third group of embodiments, along with the further descriptive attributes. In yet another aspect, a molding compound is provided, wherein the molding compound comprises at least one fiber component and a molding compound precursor composition that is combination of a curable resin blend (as described above), and optional fillers and/or additives, wherein the fiber component is dispersed in the resin composition. In further embodiments the curable resin blend is present in an amount in the range of from 20 wt. % to 80 wt. %, the fiber component is present in an amount in the range of from 20 wt. % to 80 wt. %, a filler composition is present in an amount in the range of from 0 wt. % to 80 wt. %, and one or more additives, the total of such additives in the range of from 0 wt. % to 50 wt. %, wherein the weight percentages are based on the total weight of the molding compound before the partial curing step. In further embodiments, the fiber component comprises chopped glass, carbon fiber, or a combination thereof.

In another aspect, a molding compound is provided, wherein the molding compound comprising a semisolid product produced by heating at least one fiber component mixed with a molding compound precursor composition (as described above) at a temperature and for a time period sufficient to polymerize a major portion of the acrylate monomer component. In some embodiments, the molding compound is further characterized by one or more of the following:

(A) the heating occurs in a mixer or an extruder or on sheet molding manufacturing line;

(B) the composition is heated to a temperature in the range of from 50° C. to 120° C., or from 60° C. to 110° C.;

(C) the composition is heated for a time period in the range of from 10 minutes to 60 minutes, or from 30 minutes to 50 minutes; and (D) substantially all of the acrylate monomer component is polymerized and/or crosslinked; and (E) the molding compound is a SMC or a BMC.

In another aspect, a fiber-reinforced composite is provided, wherein the fiber-reinforced composite comprising a substantially rigid product by heating the molding compound (as described above) at a temperature and for a time period sufficient to crosslink a major portion of the epoxy resin. In some embodiments, the article is formed by: 1) providing to a mold an amount of the molding compound sufficient to fill a void space in the mold, wherein the void space defines a selected shape; and 2) subjecting the molding compound in the mold to a temperature and pressure sufficient to conform the molding compound to the shape of the void space and crosslink a major portion of the epoxy resin. In some embodiments, the molding compound is further characterized by one or more of the following:

(A) the heating occurs in a mold;

(B) the composition is heated to a temperature in the range of from 120° C. to 180° C., from 130° C. to 170° C., or from 140° C. to 160° C.;

(C) the composition is heated for a time period in the range of from 5 minutes to 30 minutes, from 10 minutes to 25 minutes, or from 15 minutes to 20 minutes; and (D) substantially all of the epoxy resin is crosslinked.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following examples provide curable resin blend formulations (no additives or fillers) that are useful as in SMC resins and represent exemplary embodiments. Exemplary composite materials are formed by blending the curable resin blends with glass fibers.

Raw Materials

Raw materials used herein in the molding compounds are shown in Table 1, below.

TABLE 1

| Label | Component | Description of component | Available from: |
|---|---|---|---|
| PE1 | epoxy resin | Bisphenol A epoxy | Olin [1] |
| PE2 | epoxy resin | Novolac epoxy | Olin [1] |
| LH1 | Latent hardener | Cyanoguanidine (DICY) | Alzchem [2] |
| LH2 | Latent hardener | Nadic Methyl Anhydride | Dixie[7] |
| CC1 | Crosslinking comonomer | 1,6-hexanediol diacrylate | Sartomer [3] |
| CC2 | Crosslinking comonomer | Norbornyl diacrylate | Sartomer [3] |
| CA1 | Crosslinking accelerator | Methylene diphenylene bis(dimethylurea) | Alzchem [2] |
| CA2 | Crosslinking accelerator | Zinc chloride - 2 phenyl imidazole complex | Springfield Industries [4] |
| FR | Free radical initiator | tert-Butyl peroxyneodecanoate | Nouryon [5] |
| GF | Glass fiber | Glass fiber | Jushi [6] |

[1] Olin Epoxy, USA, +1 833 370 3737
[2] Alzchem Group AG - CHEMIEPARK TROSTBERG - Postfach 1262 83308 Trostberg
[3] Sartomer, 502 Thomas Jones Way, Exton, PA 19341
[4] Springfield Industries, LLC, 609 Folk Ct., Imlay City, MI 48444
[5] Nouryon Chemicals LLC, Polymerization Chemicals, 12900 Bay Park Road, Pasadena, TX 77507-1104
[6] (Jushi USA), Composites One LLC, 955-10 National Parkway, Schaumburg, IL 60173
[7]Dixie Chemicals., Houston, TX Examples 1 and 2 are exemplary curable resin blends, CRB1 and CRB2, as shown in TABLE 2. The components were mixed at 25° C. These curable resin blends were the molding compound precursor compositions used in the B-staging.

TABLE 2

| | Example 1 | | Example 2 | |
|---|---|---|---|---|
| Component | CRB1 | (wt. %) | CRB2 | (wt. %) |
| Epoxy Resin | PE1 | 75.3 | PE2 | 41.0 |
| Latent Hardener | LH1 | 4.4 | LH2 | 41.0 |
| Crosslinking Comonomer | CC1 | 18.1 | CC2 | 15.1 |
| Crosslinking Accelerator | CA1 | 1.4 | CA2 | 2.0 |
| Free Radical Initiator | FR | 0.8 | FR | 1.02 |

Molding Compounds

Examples 3 and 4 are exemplary molding compounds, MC1 and MC2, as shown in TABLE 2. CRB1 and CRB2 were made on an SMC manufacturing line using 1" chopped glass using the glass fiber and resin formulations shown in TABLE 3. The formed SMC formulation was subject to B-staging by heating at 200° F. (93.3° C.) for 10 minutes. The formed SMC material was allowed to cool to room temperature (25° C.).

TABLE 3

| | Example 3 | | Example 4 | |
|---|---|---|---|---|
| Component | MC1 | (wt. %) | MC2 | (wt. %) |
| Molding compound precursor composition | CRB1 | 40 | CRB2 | 40 |
| Glass Fiber | GF | 60 | GF | 60 |

Composite Materials

Composite articles were formed by placing each of the B-staged MC1 and MC2 materials into a compression mold and subjecting same to a pressure of 10 psi (69 kPa) at a temperature of 325° F. (163° C.) for 15 minutes.

Although the present invention and its advantages have been described in detail, it should be understood that various changes, substitutions and alterations can be made herein without departing from the spirit and scope of the invention as defined by the appended claims. However, it should be understood that in addition to recited ranges, any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited. Moreover, the scope of the present application is not intended to be limited to the particular embodiments of the processes, machines, film structures, composition of layers, means, methods, and/or steps described in the specification. As one of the ordinary skill in the art will readily appreciate from the disclosure of the present invention, processes, machines, film structures, composition of layers, means, methods, and/or steps, presently existing or later to be developed that perform substantially the same function or achieve substantially the same result as the corresponding embodiments described herein, may be utilized according to the present invention. Accordingly, the appended claims are intended to include within their scope such processes, machines, film structures, composition of layers, means, methods, and/or steps.

What is claimed is:

1. A curable resin composition comprising the reaction product of mixing:

a) 20 to 90 wt. %, based on a total weight of the curable resin composition, of an epoxy resin composition selected from the group consisting of a bisphenol-epoxy resin, a novolac-epoxy resin, a cycloaliphatic resin, and a combination thereof;

b) 1 to 50 wt. %, based on the total weight of the curable resin composition, of a latent hardener comprising, wherein the latent hardener is a guanidine compound;

c) 10 to 70 wt. %, based on the total weight of the curable resin composition, of an acrylate monomer component;

d) 0.1 to 5 wt. %, based on the total weight of the curable resin composition, of a crosslinking accelerator, wherein the crosslinking accelerator is a urea compound;

e) 0.1 to 5 wt. %, based on the total weight of a curable resin composition, of a free radical initiator;

f) 0 to 10 wt. %, based on the total weight of the curable resin composition, of a toughening agent;

g) 0 to 10 wt. %, based on the total weight of the curable resin composition, of a reactive diluent; and h) 0 to 50 wt. %, based on the total weight of the curable resin composition, of a filler.

2. The curable resin composition of claim 1, wherein the mixing is performed at a temperature in the range of from 20° C. to 30° C.

3. The curable resin composition of claim 1, wherein the curable resin composition comprises:

a) 60 to 90 wt. %, based on the total weight of the curable resin composition, of the epoxy resin composition, wherein the epoxy resin composition comprises a bisphenol-epoxy resin;

b) 2 to 10 wt. %, based on the total weight of the curable resin composition, of the latent hardener;

c) 10 to 70 wt. %, based on the total weight of the curable resin composition, of the acrylate monomer component;

d) 0.2 to 4 wt. %, based on the total weight of the curable resin composition, of the crosslinking accelerator;

e) 0.1 to 3 wt. %, based on the total weight of a curable resin composition, of a free radical initiator;

f) 0 to 10 wt. %, based on the total weight of the curable resin composition, of a toughening agent;

g) 0 to 10 wt. %, based on the total weight of the curable resin composition, of a reactive diluent; and h) 0 to 50 wt. %, based on the total weight of the curable resin composition, of a filler.

4. The curable resin composition of claim 1, wherein curable resin composition comprises:

a) 20 to 60 wt. %, based on the total weight of the curable resin composition, of the epoxy resin composition, wherein the epoxy resin composition comprises a novolac-epoxy resin;

b) 30 to 50 wt. %, based on the total weight of the curable resin composition, of the latent hardener;

c) 10 to 70 wt. %, based on the total weight of the curable resin composition, of the acrylate monomer component;

d) 0.2 to 4 wt. %, based on the total weight of the curable resin composition, of the crosslinking accelerator;

e) 0.1 to 3 wt. %, based on the total weight of a curable resin composition, of the free radical initiator;

f) 0 to 10 wt. %, based on the total weight of the curable resin composition, of a toughening agent;

g) 0 to 10 wt. %, based on the total weight of the curable resin composition, of a reactive diluent; and h) 0 to 50 wt. %, based on the total weight of the curable resin composition, of a filler.

5. The curable resin composition of claim 1, wherein:

the bisphenol-epoxy resin, comprises the reaction product of a bisphenol resin and epichlorohydrin;

the novolac-epoxy resin, comprises the reaction product of a novolac resin and epichlorohydrin; or a combination thereof.

6. The curable resin composition of claim 5, wherein the bisphenol resin has one or more of:

an epoxide equivalent weight in the range of from 150 g/eq to 210 g/eq;

a viscosity at 25° C. in the range of from 2,000 mPa·s to 17,000 mPa·s;

a density at 25° C. in the range of from 1.10 g/ml to 1.20 g/ml; and a hydrolyzable chlorine content in the range of from 400 ppm to 600 ppm.

7. The curable resin composition of claim 5, wherein the novolac resin has one or more of:

an epoxide equivalent weight in the range of from 100 g/eq to 250 g/eq;

a viscosity at a temperature above ~40° C. in the range of from 20,000 mPa·s to 50,000 mPa·s;

a density at 25° C. in the range of from 1.15 g/ml to 1.25 g/ml; and a hydrolyzable chlorine content in the range of from 1,400 ppm to 1,600 ppm.

8. The curable resin composition of claim 1, wherein the acrylate monomer component has at least one of:

a molecular weight of less than or equal to 300 g/mol; and a viscosity of less than or equal to 1,000 cps at 25° C.

9. A composition comprising:

a) the curable resin composition of claim 1 in an amount in the range of from 20 wt. % to 80 wt. %; and b) a fiber component in the range of from 20 wt. % to 80 wt. %;

wherein:

the fiber is dispersed in the curable resin composition; and all weight percentages are based on the total weight of the composition.

10. A molding compound comprising a semisolid product produced by heating the composition of claim 9 at a temperature and for a time period sufficient to polymerize at least 90% of the acrylate monomer component of said curable resin composition.

11. The molding compound of claim 10, wherein the composition is heated for a time period in the range of from 10 minutes to 60 minutes.

12. The molding compound of claim 10, wherein at least 99% of the acrylate monomer component is polymerized.

13. A substantially rigid shaped article comprising a fiber-reinforced composite, the article formed by:

a) providing to a mold an amount of the molding compound of claim 10 sufficient to fill a void space in the mold, wherein the void space defines a selected shape; and b) subjecting the molding compound in the mold to a temperature and pressure sufficient to conform the molding compound to the shape of the void space and crosslink a major portion of the epoxy resin.

14. The substantially rigid shaped article of claim 13, wherein the heating occurs in a mold.

15. The substantially rigid shaped article of claim 13, wherein the molding compound is heated to a temperature in the range of from 120° C. to 180° C.

16. The substantially rigid shaped article of claim 13, wherein the composition is heated for a time period in the range of from 5 minutes to 30 minutes.

17. The substantially rigid shaped article of claim 13, wherein substantially all of the epoxy resin is crosslinked.

* * * * *